(12) United States Patent
Newhan

(10) Patent No.: US 6,481,079 B1
(45) Date of Patent: Nov. 19, 2002

(54) KIT TO RAISE VEHICLE FRONT END

(76) Inventor: Mark Newhan, 9268 Lakeview Ter., Lakeview, CA (US) 92040

(*) Notice: Subject to any disclaimer, the term of this patent is extended or adjusted under 35 U.S.C. 154(b) by 0 days.

(21) Appl. No.: 09/841,897

(22) Filed: Apr. 25, 2001

(51) Int. Cl.$^7$ .............................................. B23P 23/00
(52) U.S. Cl. ................................... 29/401.1; 280/86.75
(58) Field of Search ...................... 29/401.1; 280/86.75, 280/86.751, 86.754, 86.755, 86.757

(56) References Cited

U.S. PATENT DOCUMENTS

| | | | | |
|---|---|---|---|---|
| 2,544,331 A | * | 3/1951 | Kogstrom | 280/86.754 |
| 2,816,802 A | | 12/1957 | Buvelot | 301/131 |
| 3,161,419 A | | 12/1964 | Schaaf | 280/96.1 |
| 3,758,129 A | | 9/1973 | Ishikawa et al. | 280/96.1 |
| 3,764,158 A | * | 10/1973 | Lukasik et al. | 280/86.75 |
| 3,881,741 A | * | 5/1975 | Müller | 280/86.751 |
| 4,226,440 A | | 10/1980 | Chappell et al. | 280/660 |
| 4,371,191 A | * | 2/1983 | Goldberg et al. | 280/86.757 |
| 4,951,959 A | | 8/1990 | Watanabe et al. | 280/96.1 |
| 5,301,977 A | * | 4/1994 | Schlosser et al. | 280/86.75 |
| 5,446,955 A | * | 9/1995 | Singh | 29/401.1 |
| 5,558,360 A | | 9/1996 | Lee | 280/675 |
| 5,951,030 A | * | 9/1999 | Butler | 29/401.1 |
| 6,227,554 B1 | * | 5/2001 | Mueller | 280/86.757 |

OTHER PUBLICATIONS

Bull's Eye Industries brochure "Chevy Owners 2WD 3" Lift" (1998).

* cited by examiner

*Primary Examiner*—S. Thomas Hughes
*Assistant Examiner*—Steven A Blount
(74) *Attorney, Agent, or Firm*—Fitch, Even, Tabin, & Flannery

(57) ABSTRACT

A kit and method for raising the static height of the front end of a vehicle having independent front wheel suspension while substantially retaining the suspension geometry of the front wheels. Pairs of bracket adaptors and modified upper control arms of a length shorter than the factory control arms are used. The bracket adaptors interfit with factory brackets and facilitate the attachment of the inboard ends of an A-frame upper control arm with a pivot axis at least about one inch lower and at least about one inch outboard of the factory location. The inboard ends of each modified upper control arm are suitably pivotally linked to the bracket adaptors, and the outboard end is conventionally attached via the upper ball joint to the spindle plate. Replacement coil springs, preferably variable rate springs, raise the front end vehicle height about three inches; however, the geometry provided through such relocation avoids subjecting the tires to excessive positive camber when cycling occurs to absorb a dip in the roadway or the like.

6 Claims, 3 Drawing Sheets

KIT TO RAISE VEHICLE FRONT END

This invention relates to a kit to raise the front end of a vehicle and more particularly to a kit and a method for raising the front chassis of a truck or sport utility vehicle (SUV) equipped with independent front wheel suspension and standard rear wheel drive.

BACKGROUND OF THE INVENTION

In past years, a number of products have been produced and sold on the aftermarket for light trucks and SUVs which products are designed to raise the front chassis a few inches to enhance the look of the vehicle, i.e. vehicle aesthetics, as well as to accommodate a larger tire than the stock tires that would be supplied by the manufacturer. Heretofore, methods generally used for obtaining greater clearance between a tire and the wheel opening have oftentimes simply installed coil springs of greater length or different spring character that would raise the chassis without making any complementary changes to the suspension; however, it is felt that such adjustments can compromise the original factory design pertinent to suspension movement, wheel alignment and steering geometry, which can very likely result in excessive tie rod angle, excessive ball joint angle and excess A-frame angle all of which lead to excessive tire wear, particularly during cornering. In a few instances, the accommodation of such larger coil springs has been facilitated by removal and relocation of factory pivot points in order to simulate factory wheel alignment specifications at a static height. However, one ensuing problem that often occurs from such a relocation is a tilting outward of the tire, i.e. excessive positive camber; this eliminates a complete contact patch of the tire on the surface of the road and is considered to be extremely dangerous during conditions of severe weather, i.e. snow, ice, rain and/or mud. Moreover, vehicles having such modifications often encounter resulting failure of suspension components during normal vehicle operation, examples of which include cracking or fracturing of an upper A-frame control arm as a result of topping out on a suspension stop, and premature failure of ball joints, tie rod ends, pitman arms and/or idle arms.

In view of the foregoing, it has been felt that new approaches are needed to effectively and safely raise the front end of a vehicle. Particularly sought are arrangements which do not disturb the normal functioning of the front suspension and which do not significantly detract from the ride of the vehicle following such adjustments.

SUMMARY OF THE INVENTION

The present invention provides a kit for raising the static height of the front end of a vehicle having independent front wheel suspension which utilizes a spindle supported by upper and lower control arms, generally of the A-frame variety, while substantially retaining the factory suspension geometry of the front wheels and tires. The kit includes a pair of bracket adaptors for each front wheel, which interfit with the factory brackets and allow an upper-replacement control arm to be attached to the vehicle chassis via mounting holes that are located at least about one inch lower and at least about one inch outboard of the original factory location for such mounting holes. A modified upper control arm having a length shorter than that of the factory control arm carries fittings that interfit with the aforementioned bracket adaptors so as to allow the upper control arm to pivot about a generally horizontal axis. The outboard end of the control arm is essentially the same as the factory control arm; it facilitates normal attachment through a ball joint to the spindle plate to which the front wheel is mounted. Overall, the kit allows the chassis of a light pick-up truck or SUV to be raised at least about 3 inches above factory standard height without subjecting the associated wheel and tire to excessive positive camber when cycling to absorb dips in the roadway.

Overall, there is provided a method for raising the static height of the front end of a vehicle having independent front wheel suspension with minimum disturbance of normal suspension geometry and without change to the factory ball joints, the result of which is an arrangement which permits full normal suspension travel.

DETAILED DESCRIPTION OF A PREFERRED EMBODIMENT

Figure 1:
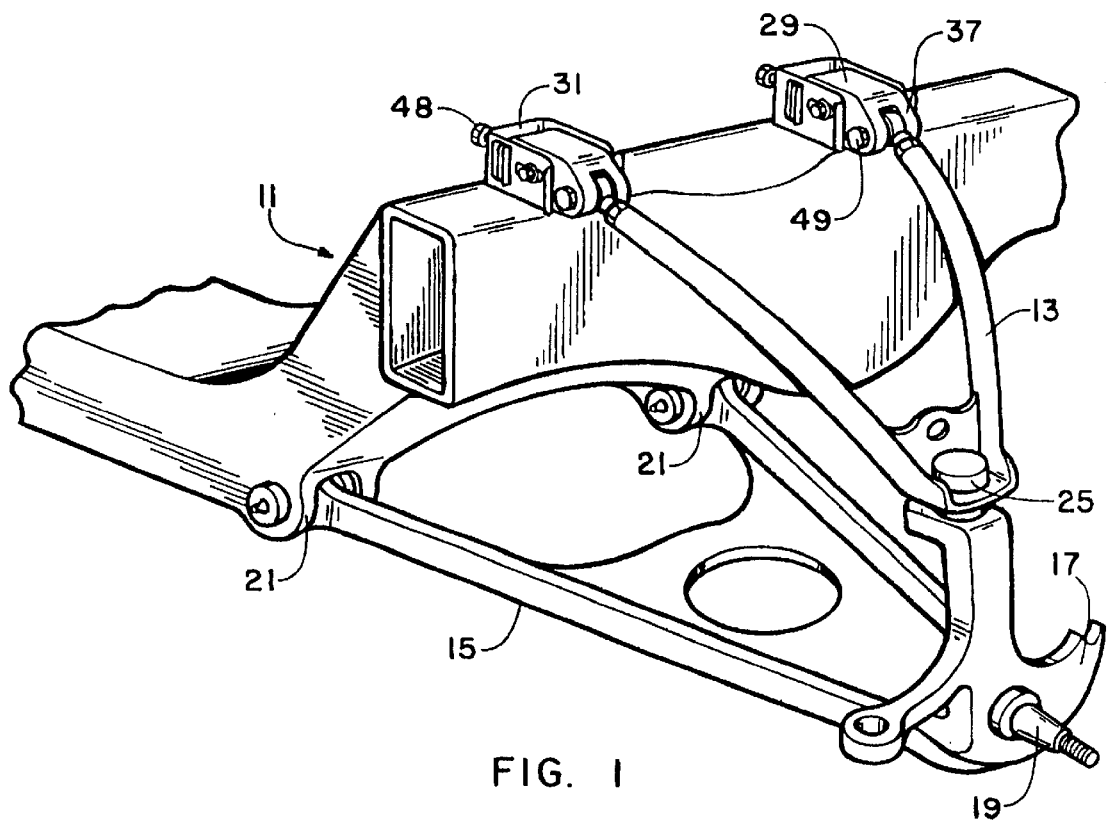
FIG. 1 is a fragmentary perspective view of the chassis of a vehicle having independent front wheel suspension, with a portion of the spindle or upright plate broken away, on which vehicle has been installed a portion of a kit embodying various features of the invention.

Basically, the kit embodying various features of the invention allows an owner of a light pick-up or SUV having independent front wheel suspension to raise the static height of the vehicle chassis about three inches, effectively giving the vehicle a new "operating height", i.e. ground clearance of the vehicle chassis, while allowing the suspension geometry of the wheel and tire to remain substantially as though the vehicle had never been altered from factory standards. The kit provides "bolt-on" bracket adaptors that can be suitably affixed to the vehicle chassis or frame using the manufacturer's mounting brackets. These bracket adaptors relocate the horizontal pivot axis of a modified upper control arm, having a length which is slightly shorter than the factory upper control arm, about one inch downward and about one inch outboard from the existing factory pivot, and they provide an arrangement for pivotally mounting the inboard ends of such an upper control arm.

By relocating the pivot axis, the shorter replacement upper control arm will now travel in a broader arc relative to the frame, than would the factory upper control arm, whenever the wheel drops, i.e. when the chassis rises relative to the wheel. As a result, when the vehicle suspension compresses and extends, i.e. to absorb dips and rises in the road, the vehicle tires do not "cycle" through an excessive amount of positive camber, which is a disadvantage very common with other arrangements that have heretofore been employed to raise the static height of the front end of such a vehicle. Positive camber may be described as the action of a tire tilting outboard at its top, and the undesirable effects of such action can be compounded when the vehicle is also in a turn so there are G-forces naturally tending to cause the vehicle to lean into the turn. Whenever such excessive positive camber occurs, as for example as a result of the incorporation of other arrangements for raising the static height of a vehicle, the contact patch of the tire against the road surface is significantly reduced, and as a result, the vehicle becomes dangerous to drive on wet surfaces.

The aforementioned potential disadvantage is avoided by using a kit embodying features of the present invention which employs specific replacement parts that work together to provide a desirable geometry correction when the front end of an independent front end suspension vehicle has been "lifted", i.e. had its static height significantly raised. In the arrangement provided by the kit that is illustrated, the furthest outer point of arc of the upper control arm remains no greater than the factory arc because the centerline of the arc has been lowered, and accordingly the front tires continue to travel in stock format even though the modified vehicle has an enhanced height of about three inches. Thus, a correction is embodied within the components of the kit so that the upper control arm retains an arc that is substantially identical to the arc of the factory-installed upper control arm; in this manner, potentially excessive positive camber does not occur when the aforementioned driving conditions are encountered.

Illustrated in FIG. 1 is a fragmentary portion of a vehicle chassis 11 in the region of the front wheel support on the driver's side of a U.S. vehicle. Pivotally attached to the chassis are an upper control arm 13 and a lower control arm 15 that are in turn connected to the spindle or upright plate 17 which carries the horizontal spindle 19 on which the front wheel is rotatably supported. The lower control arm 15 is the factory-supplied component which is pivotally mounted at its inboard end by the factory-provided lower brackets 21.

The outboard end of this A-frame-type lower control arm 15 is connected via a ball joint 23 (see FIG. 5) to the bottom of the spindle plate 17. The outboard end of the upper control arm 13 is similarly mounted by a ball joint 25 to an upper region of the spindle plate 17.

The mounting of the inboard ends of the upper control arm 13 is effected via a pair of bracket adaptors 29 (see FIGS. 2 and 3) that are designed to be received in the factory-installed brackets 31 that are welded or otherwise suitably affixed to the upper surface of the chassis. The bracket adaptors 29 have a pair of parallel flat sides 33 that are vertically oriented and fit inside the two parallel walls of the factory-installed brackets 31. The adaptor 29 has a flat lower surface 35 which slides along an upper horizontal surface of the chassis, and the front end portion of the bracket adaptor is machined to provide a clevis 37 having a bore 39 that extends completely therethrough.

Figure 2:
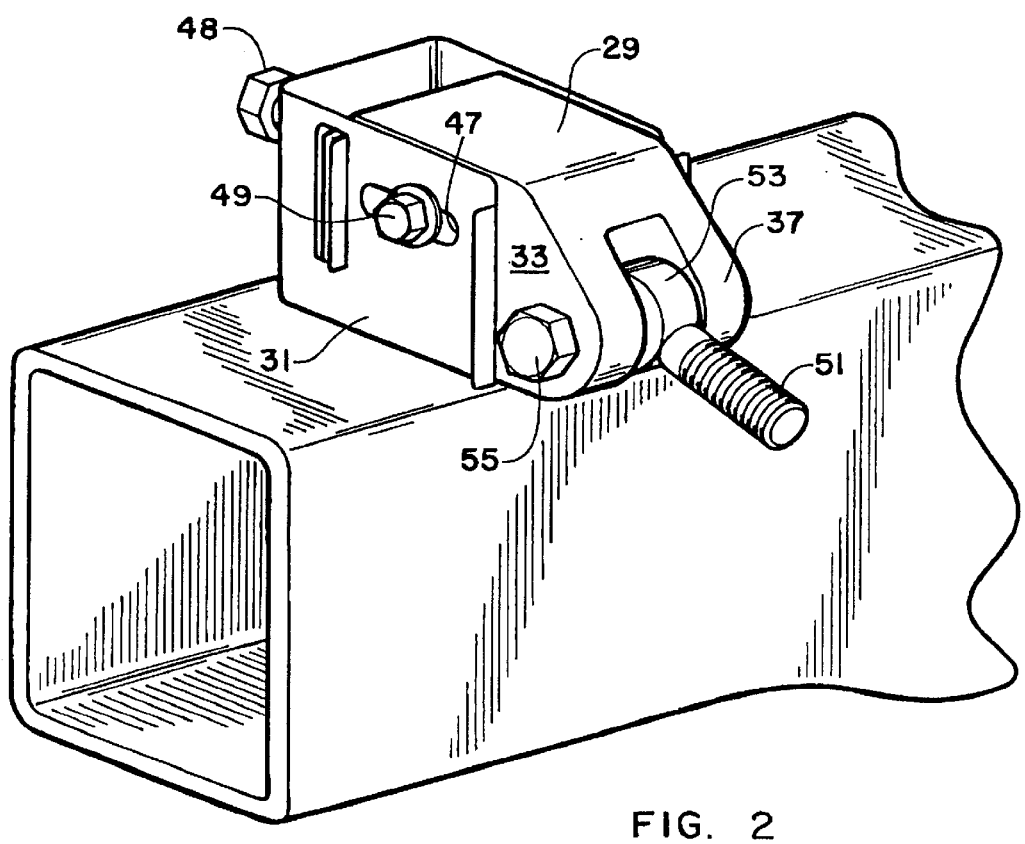
FIG. 2 is an enlarged fragmentary view showing one of the bracket adaptors depicted in FIG. 1 with the inboard end of the upper A-frame in place and broken away.
Figure 3:
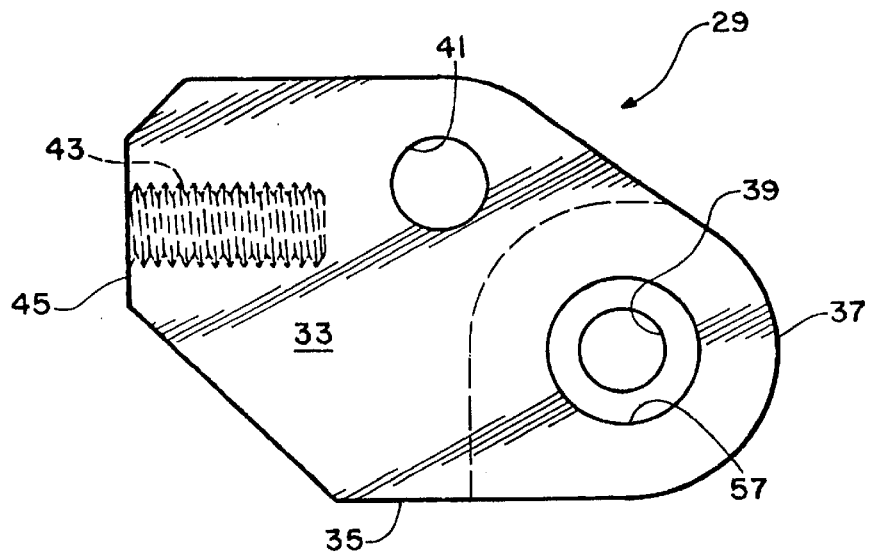
FIG. 3 is an enlarged side view of the bracket adaptor shown in FIG. 2.

As can be seen in FIG. 2, the adaptor 29 is slidably received in the factory-installed brackets 31 with the clevis portion 37 extending outboard. For installation and adjustment purposes, a pair of additional holes are provided in the bracket adaptor. A through hole 41 extends parallel to the clevis bore 39, and a tapped hole 43 is aligned parallel to the plane of the lower surface 35 and extends inward from a rear surface 45 of the bracket adaptor. The hole 41 is positioned so as to be aligned with a pair of slots 47 in the parallel sidewalls of the brackets 31. To retain the bracket adaptor 29 in precise position in the factory-installed bracket, an adjusting screw 48 having threads that mate with the tapped hole 43 is rotatably captured in the rear wall of the bracket 31. This could be a flat Allen-head bolt or the like that would not move axially so that clockwise or counterclockwise rotation would cause sliding of the bracket adaptor 29 either inboard or outboard in the factory-installed bracket 31, thus allowing the pivot axis of the modified upper control arm 13 to be finely adjusted. A suitable bolt 49, such as hex-head bolt, would be passed, through the hole 41 and a washer and locknut would be installed on the threaded end so that tightening of the locknut, once the adaptor 29 has been adjusted to the desired location, would lock it in position and thus cooperate with the threaded adjusting screw 48 in the tapped hole 43 in this respect.

The inboard ends of the upper control rod 15 are provided with aircraft rod end fittings 51 that each terminate in a lubricatible swivel connector 53 that is proportioned so as to be received between the two arms of the clevis 37. It is pivotably mounted in this position by a bolt 55 that passes through the bore 39 of the clevis. Preferably, the sidewalls 33 of the bracket adaptor 29 are counterbored in the clevis region to provide counterbores 57 (FIG. 3) that accommodate the head and the locknut of the bolt 55 used to mount the upper control arm 13 at each clevis 37.

Figure 4:
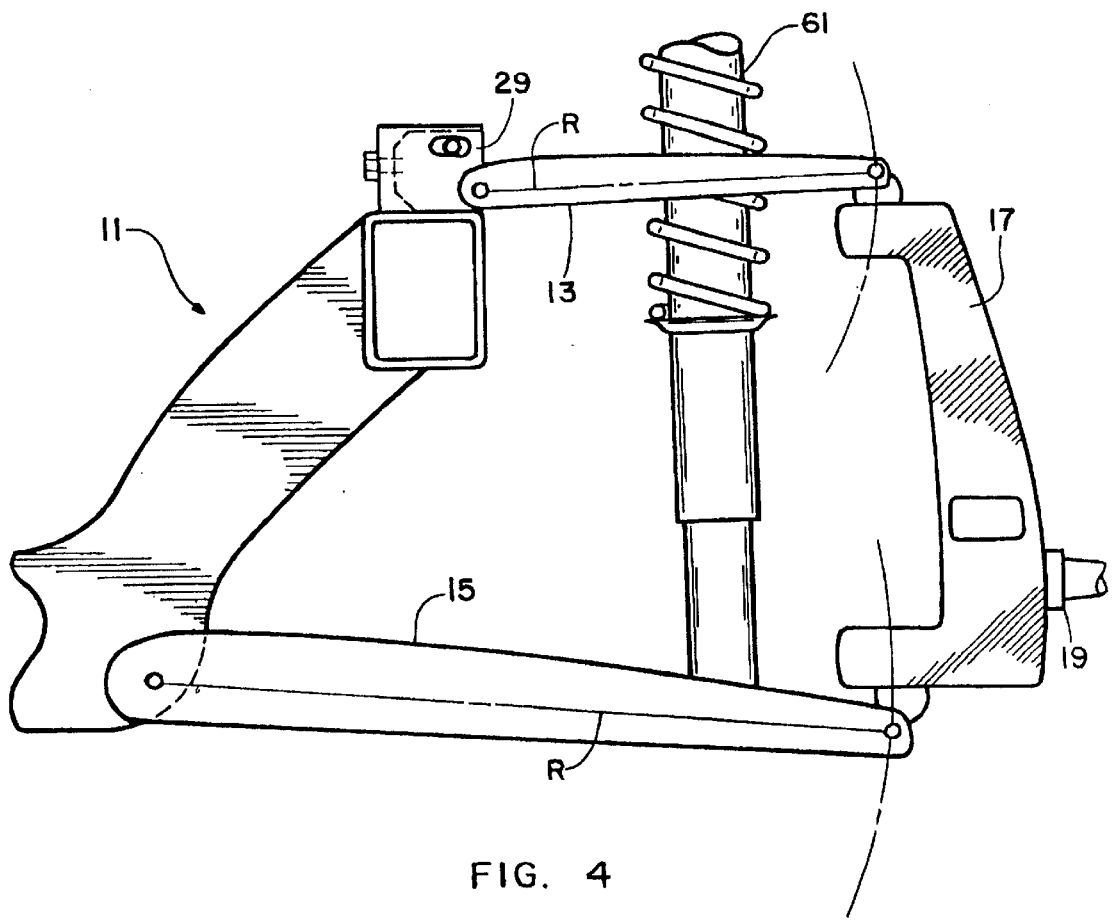
FIG. 4 is a fragmentary front view of the vehicle of FIG. 1 showing a front wheel suspension with the kit installed and the vehicle at rest.

FIG. 4 illustrates the suspension system which includes a strut or spring assembly 61 interconnecting the lower control arm 15 to an upper location on the chassis. If desired, this strut or spring assembly 61 may include a shock absorber. The coil springs that are employed are preferably variable rate coil springs. These springs will have a constant diameter but the pitch of the coil will be different from the stock factory springs in the replacement front end springs that will be supplied as part of the kit for raising the vehicle about three inches in elevation over the stock design. These replacement springs are preferably proportioned so as to vary in pitch from the upper end to the lower end thereof. As a result, the replacement spring will unload with less force near the end of its extension, for example only 100 pounds of force might be needed for the first inch of compression whereas 250 pounds might be needed for the second inch of compression and perhaps 500 pounds needed for the third inch of compression. Although a standard, uniformly wound spring could be employed, variable rate springs are preferred; they cooperate with this revised mounting arrangement to provide a synergistic effect in contributing to a smooth, safe ride. This will be further apparent from the discussion that follows with respect to FIGS. 5 and 6.

Figure 5:
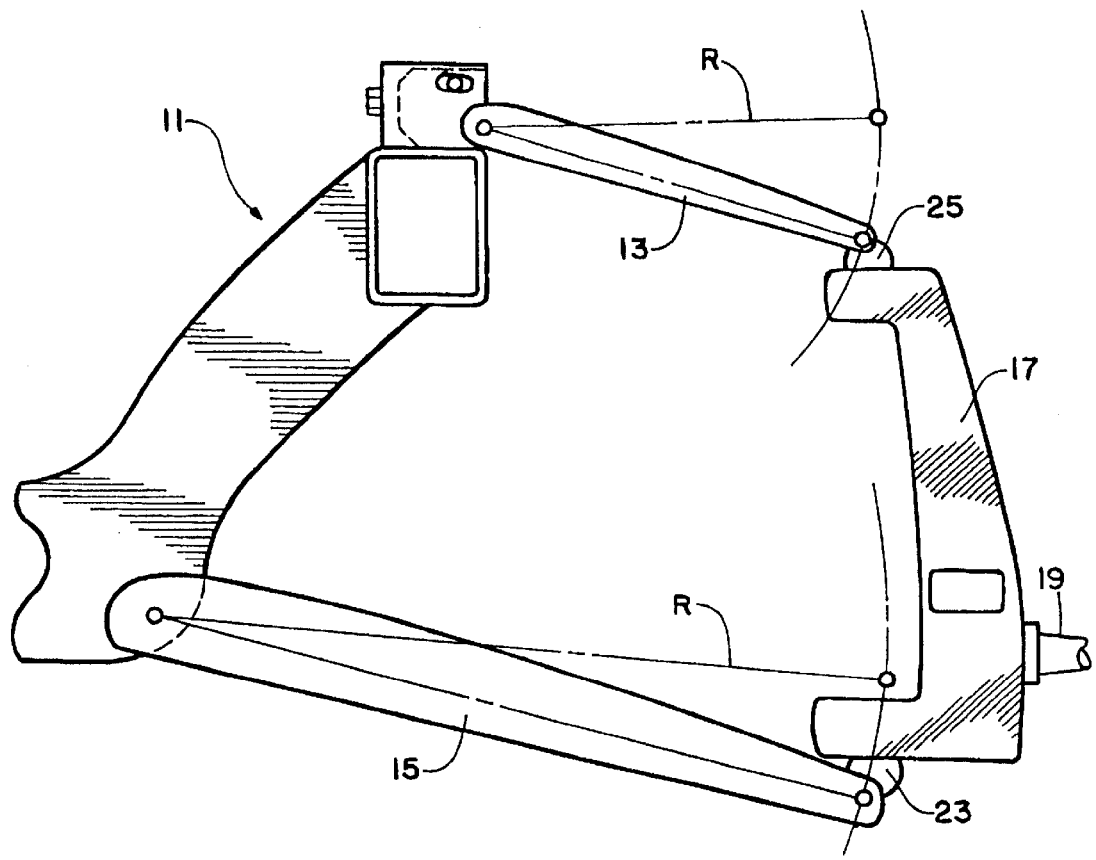
FIGS. 5 and 6 are diagrammatic views which show the extent of vertical movement in the front end suspension of a vehicle incorporating the adaptor kit shown in FIG. 1 during operation along a roadway first when the chassis is elevated relative to the tire and spindle assembly and then when the chassis has moved downward as a result of encountering a dip or the like in a roadway.
Figure 6:
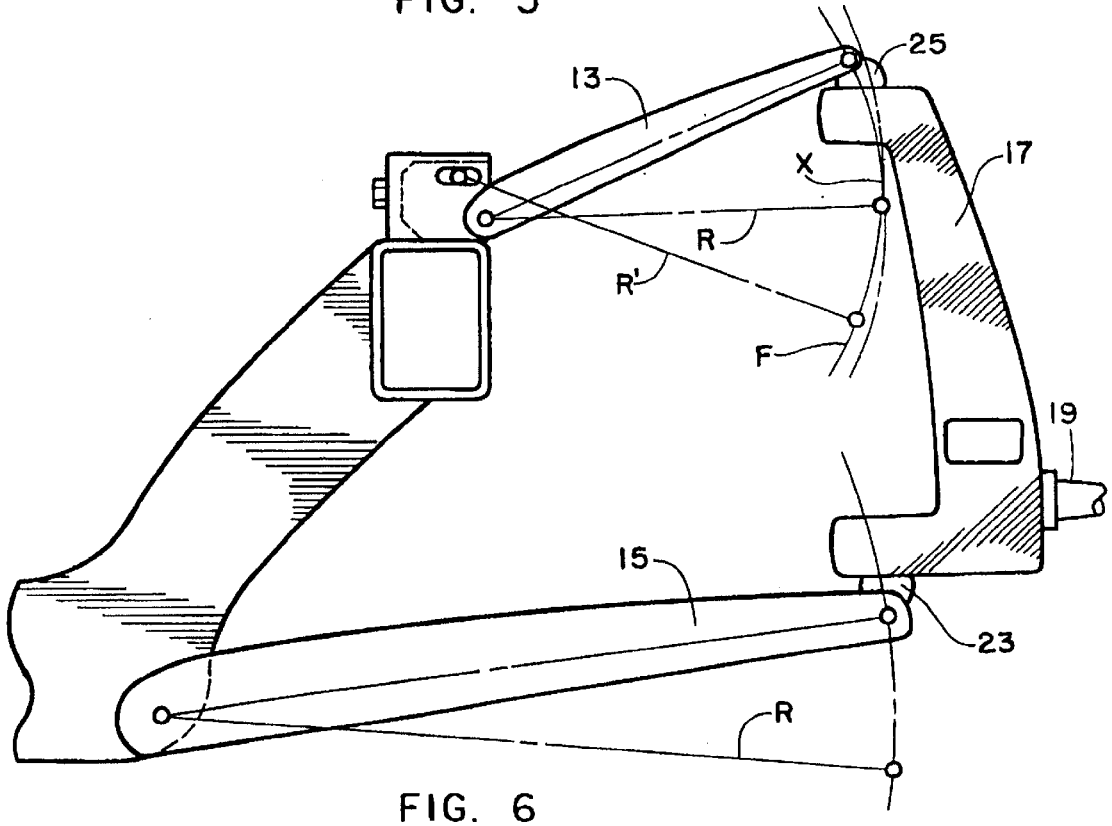

FIGS. 5 and 6 are diagrammatic views which show the effect of vertical movement in the front end suspension of a vehicle incorporating this novel adaptor kit which includes the replacement upper wishbone-type control arms 13 mounted through the bracket adaptors 29 and the replacement spring assemblies 61 that would add three inches to the elevation of the chassis and body of the vehicle above the ground. FIG. 5 shows the suspension when the chassis 11 is elevated relative to the ground to about the maximum extent allowed by the suspension. The arcs of each of the upper and lower control arms 13, 15 are shown swinging about the pivot points. It can be seen that, although the control arms have here pivoted about 20° below what would be considered their at rest orientations (indicated by the dashed lines R in FIG. 4), the spindle or king-pin 19 is still oriented essentially horizontally so that there is still a complete contact patch of the tire on the surface of the road. It can be seen from the similarity of the two arcs of the lower control arm 15 and the upper control arm 13 that this attitude will remain as the chassis drops back to its normal position.

The opposite extreme is depicted in FIG. 6 where the chassis is depressed relative to the road surface, and the control arms 13 and 15 have swung about their respective pivot axes to a position between about 20 and 25° above their at rest or normal position which is again indicated by dashed lines marked R. In this orientation, it is possible to compare the position of the outboard end of the upper control arm 13 where it connects to the ball joint 25 to the position where the factory-installed control arm would be, which would pivot about a center of. rotation at the center of the slot 47 of the factory-installed bracket 31. The pivot radius is labeled R', and its swinging movement is shown by the arc labeled F (for Factory). Comparison shows that it would be positioned very close to where the factory control arm would be, as the two respective arcs cross at about the point labeled X just below the location shown in FIG. 6. Therefore, it can be seen that the kit that is provided results in a performance that essentially duplicates the stock, factory suspension while still providing the user of the vehicle with the desired three-inch greater elevation, which accomplishes a most satisfactory arrangement. Coupling this arrangement with the optional variable rate compression springs, a ride is obtained that essentially duplicates the ride of the stock vehicle even though there will be the three inch greater elevation and accordingly a greater up-and-down movement during travel over bumpy terrain or the like.

Although the invention has been described with regard to certain preferred embodiments, it should be understood that various changes and modifications as would be obvious one ordinarily skilled in this art may be made without departing from the scope of the invention which is set forth in the claims appended hereto.

Particular features of the invention are emphasized in the claims that follow.

What is claimed is:

1. A kit for raising the static height of the front end of a vehicle having independent front wheel suspension in the form of a spindle which mounts a front wheel and is supported by upper and lower factory control arms, while substantially retaining the suspension geometry of the front wheels and tires, which kit comprises a pair of bracket adaptors for each front wheel designed to interfit with factory brackets for attaching the upper control arm to the vehicle chassis, said bracket adaptors providing mounting holes for the upper control arms that are at least about one inch lower and at least about one inch outboard of an original factory location, a modified upper control arm having a length shorter than the factory upper control arm and having two inboard ends and an outboard end, means at each said inboard end for interconnecting with one of said pair of bracket adaptors so that said modified upper control arm pivots about a substantially horizontal axis, and means at said outboard end for attachment through a ball joint to a plate carrying the spindle, whereby said chassis can be raised at least about three inches above factory height without subjecting said wheel and tire to excessive positive camber upon cycling to absorb a dip in the roadway on which the vehicle is being operated.

2. The kit according to claim 1 wherein there is included a replacement spring having a spring modulus that is different from the factory spring.

3. The kit according to claim 2 wherein said replacement spring is a variable rate coil spring.

4. The kit according to claim 3 wherein said replacement spring is a helical spring having a progressive winding.

5. A method for raising the static height of the front end of a vehicle having independent front wheel suspension in the form of a spindle supported by upper and lower factory control arms, while substantially retaining the suspension geometry of the front wheels and tires, which method comprises removing the factory upper control arm, lowering and shifting outboard the pivot axis of the factory upper control arm by installing a pair of bracket adaptors for each front wheel which interfit with original factory brackets for attaching an upper control arm to the vehicle chassis, said bracket adaptors providing mounting holes for upper control arms that are at least about one inch lower and at least about one inch outboard of an original factory location for such mounting holes, installing a modified control arm having a length shorter than original factory upper control arm by interconnecting inboard ends thereof with said pair of bracket adaptors so that said upper control arm pivots about a substantially horizontal axis, and attaching an outboard end of said modified upper control arm to a ball joint that is linked to a plate carrying the spindle, whereby said chassis can be raised at least about three inches above factory height without subjecting said wheel and tire to excessive positive camber upon cycling to absorb a dip in the roadway on which the vehicle is being operated.

6. The method according to claim 5 which includes installing spring means that raises the level of the chassis at least about 3 inches above its level in the vehicle at the time of delivery from the factory.

\* \* \* \* \*